United States Patent [19]

LaGasse

[11] Patent Number: 5,724,169
[45] Date of Patent: Mar. 3, 1998

[54] PHASE-MODULATED FIBER OPTIC COMMUNICATION LINK WITH CARRIER SIGNAL FILTERING

[75] Inventor: Michael J. LaGasse, Seattle, Wash.

[73] Assignee: The Boeing Company, Seattle, Wash.

[21] Appl. No.: 607,366

[22] Filed: Feb. 27, 1996

[51] Int. Cl.$^6$ ............................................. H04B 10/12
[52] U.S. Cl. ........................ 359/173; 359/161; 359/183
[58] Field of Search ................................ 359/154, 161, 359/173, 181, 183, 188, 195, 279; 455/42

[56] References Cited

U.S. PATENT DOCUMENTS 5,373,383  12/1994  LaGasse ................................ 359/161
5,432,631  7/1995  Mamyshev ............................ 359/183

OTHER PUBLICATIONS

Mark L. Farwell et al., "Increased Linear Dynamic Range by Low Biasing the Mach–Zehnder Modulator," *IEEE Photonics Technology Letters*, vol. 5, No. 7, Jul. 1993, pp. 779–782.

Daniel J. Fitzmartin et al., "Coherent Phase Modulation for Remote Antenna Applications," Photonics Systems for Antenna Applications Symposium, Monterey, California, Jan. 1991.

Norio Takato et al., "128–channel Polarization—Insensitive Frequency–Selection–Switch Using High–Silica Waveguides on Si," *IEEE Photonics Technology Letters*, vol. 2, No. 6, Jun. 1990, pp. 441–443.

K.J. Williams et al., "Observation of Photodetector Nonlinearities," *Electronics Letters*, vol. 28, No. 8, Apr. 9, 1992, pp. 731–732.

*Primary Examiner*—Kinfe-Michael Negash
*Attorney, Agent, or Firm*—Christensen, O'Connor, Johnson & Kindness PLLC

[57] ABSTRACT

A phase-modulated fiber optic communication link (9) with carrier signal filtering is disclosed. The phase-modulated fiber optic communication link (9) includes a laser (11) that produces a optical carrier signal that is conveyed by an optical fiber (13) to a phase modulator (15). A modulated RF signal phase modulates the optical carrier signal and produces a phase-modulated signal comprising a carrier component (27), an upper sideband (29), and a lower sideband (31). The upper and lower sidebands are out of phase by 180 degrees. The phase-modulated signal is conveyed by an optical fiber to a delay line filter (21). In one embodiment of the invention, the delay line filter (21) attenuates the power of the optical carrier signal and passes the sidebands substantially unattenuated. One of the sidebands is phase shifted by 180 degrees by the delay line filter. The output of the delay line filter is applied to a photodiode detector (23), which recovers the RF modulated signal. In an alternative embodiment of the invention, the delay line filter (76) divides the phase-modulated signal into two signals, each containing a part of the optical carrier signals and one of the sidebands. One of the two signals is phase shifted with respect to the other signal, whereby the sidebands contained in the two signals are in phase. The signals are applied to two photodiodes (88, 89) whose outputs are combined in a differential detector (90) resulting in the recovery of the RF modulated signal.

21 Claims, 6 Drawing Sheets

PHASE-MODULATED FIBER OPTIC COMMUNICATION LINK WITH CARRIER SIGNAL FILTERING

FIELD OF THE INVENTION

This invention relates to methods and apparatus for conveying signals from one remote site to another site and, more particularly, to fiber optic links for conveying signals from one remote site to another site.

BACKGROUND OF THE INVENTION

Typical communication links in both commercial and military airborne platforms (e.g., aircraft) include numerous receiving antennas. Information received by an antenna is conveyed along transmission media to electronics for processing. In aircraft, processing electronics are conventionally located in an electronics bay that is easily accessed for service.

In contrast, typical aircraft antennas are not easily accessed for service. Antennas are usually situated throughout the upper and lower surfaces of the fuselage and wings of an aircraft. In the event that electronics are required at such remote antenna sites, wires must be routed to the site to deliver DC power to the electronics. The need to route wires to remote aircraft locations often creates manufacturing difficulty and expense. If components at the remote site fail, the difficulty of accessing the components significantly increases repair time and expense. Therefore, it is highly desirable to minimize, if not entirely eliminate, the need for active components at remote antenna sites. The elimination of active components eliminates the need for power. The minimization of components reduces the likelihood that components will have to be repaired.

Many conventional electronic systems employ coaxial cables to carry communication signals from one site to another. The use of coaxial cable to convey communication signals from a remote aircraft antenna to an electronics bay has a number of disadvantages. Weight, susceptibility to electromagnetic interference, relatively high signal loss, significant signal dispersion, and high radar cross section are examples of disadvantages associated with the use of coaxial cables to carry signals to and from aircraft antennas.

In addition to the foregoing drawbacks, coaxial cable links carrying high frequency antenna signals have an additional problem. In general, signal losses along coaxial cables cause a degradation in signal-to-noise ratio (SNR). Link parameters such as dynamic range, noise figure, and link gain are also degraded. Replacing coaxial cable with waveguides is not practical because of the bulk, weight, and expense of waveguides.

Some communication systems employ optical fiber links to avoid some of the disadvantages associated with the use of coaxial cables and waveguides. Fiber optic links provide adequate signal performance. They are particularly attractive for use in airborne platforms to convey signals between a remote location and a convenient location, such as antennas located on the skin of an aircraft and receivers located in an electronics bay. In such applications, optical fibers provide low-cost, light-weight, and wide bandwidth communication media that are immune to electromagnetic interference. Optical fibers have low signal dispersion, low signal loss, and a low radar cross section. Fiber optic links can have better performance with regard to dynamic range, noise figure, link gain, and signal-to-noise ratio for high-frequency links than communication media formed of electromagnetic conducting material, such as coaxial cable.

The traditional method of using fiber optic links to couple remote antennas to receivers employs directly modulated lasers or external $LiNbO_3$ modulators located at the antenna. Directly modulated lasers have adequate radio frequency (RF) performance at frequencies below approximately 1 GHz. At higher frequencies, an increase in relative intensity noise (RIN) degrades dynamic range and noise figure. Accordingly, for high-frequency applications, external $LiNbO_3$ modulators are often employed. External $LiNbO_3$ modulators include both linearized modulators and Mach-Zehnder (MZ) modulators. While linearized modulators have a more linear transfer function than MZ modulators, they have a more complex optical layout and require feedback control at a remote site, namely, the antenna, to compensate for temperature-induced bias drifts. Because linearized modulators require remotely located feedback control circuitry, the cost associated with maintenance and repair of such modulators is undesirably high.

While MZ links have advantages over conventional electrical links, they also have disadvantages. MZ modulators typically require electronic circuitry to keep the modulator bias in the most linear regions. As a result, MZ modulators require DC power. As noted above, supplying DC power to remotely located electronics has several disadvantages. MZ modulators' need for electronic circuitry to keep the modulator bias in the most linear regions arises in various ways. For sub-octave links, it is desirable to use a high-power, low-noise laser and bias the MZ modulator toward a null in order to filter out excess optical carrier power and improve performance. Carrier filtering typically requires bias accuracy of less than one degree. Such precision requires the presence of active circuitry at the modulator. When the MZ modulator is located at a remote site, such as an aircraft antenna, as noted above, the requirement for such circuitry increases installation and service costs. Additionally, high-powered, or short wavelength, lasers can cause photorefractive effects in the $LiNbO_3$ included in an MZ modulator. This constitutes another limitation. Photorefractive effects can cause a slight bias shift or an imbalance in Y junction splitting resulting in a shift of the operating point and a degradation of the performance of a communication link employing an MZ modulator. Overcoming this effect further complicates MZ modulator bias circuitry. Temperature or other environmentally induced factors whose effects can also be compensated for by feedback circuitry also impact the operating point of an MZ modulator. The absence of feedback circuitry results in a significant degradation of link parameters. While the spur-free dynamic range of a standard MZ communication link can be improved by raising the power level of the optical carrier signal, this can create other problems. Specifically, when illuminated with excessive optical power, the photodiodes used to detect modulated optical carrier signals become nonlinear or are damaged.

In an attempt to address the foregoing and other limitations, substantial efforts have been made to develop bias-free MZ modulators. Active trimming during the manufacturing process has been used to obtain a bias point near quadrature, the linear operating point. While such MZ modulators are stable to within a few degrees of quadrature during temperature variation, greater accuracy is required of communication links having more than an octave of bandwidth since small drifts from quadrature generate substantial second order distortions. In addition, applications that require biasing near the null for carrier filtering also require greater biasing accuracy. The requirements of such applications have, to date, necessitated the continued use of active bias control resulting in the remote antenna site disadvantages discussed above.

In contrast to MZ communication links, which employ amplitude modulation, remote antenna communication links have employed phase modulation in a way that obviates the need for circuitry at the antenna site. In the past, phase demodulation has been accomplished using a coherent optical technique that employs a passive phase modulator at the antenna site and a second laser at the receiver. The second laser forms a local oscillator. The frequency of the signal produced by the second laser must be optically coherent with the frequency of the first (carrier signal) laser. In some cases, the signals must also be phase locked. Phase modulated communication links have many advantages over MZ communication links. The advantages include lower loss due to the inclusion of a simple straight channel waveguide phase modulator, simpler processing since bias drift is not an issue, and more efficient electrode design. In addition, at high optical power levels, phase modulators are inherently less susceptible to photorefractive degradation than MZ modulators. Although performance is satisfactory, in the past, phase-modulated communication link receivers have been complex and expensive. Furthermore, in the past, optical carrier filtering could not be used in phase-modulated communication links. Carrier filtering is often crucial in preventing damage or distortions to photodiode detectors. Finally, optical carrier filtering in an optical communication link can be used to prevent the generation of photodiode-induced harmonic distortion, improve SNR, and increase the dynamic range of the optical fibers used in the link.

In summary, a need exists for a new and improved optical communication link suitable for use between a conveniently located electronics bay and a remote antenna site. The optical communication link should not require power at the antenna site and should avoid or overcome some if not all of the disadvantages of the previously developed optical communication links discussed above. The present invention is directed to providing such an optical communication link.

SUMMARY OF THE INVENTION

In accordance with this invention, a phase-modulated fiber optic communication link that employs carrier signal filtering is provided. The phase-modulated fiber optic communication link is ideally suited for use in linking a remote site, such as an antenna located in the wings or fuselage of an aircraft, to a convenient site, such as an electronics bay. The phase-modulated fiber optic communication system includes a phase modulator located at the signal receiving location, i.e., at the remote antenna. The phase modulator is coupled to an optical carrier signal produced by a coherent source, i.e., a laser. The phase modulator combines a received RF signal with the optical carrier signal to produce a phase-modulated signal that has sidebands whose frequencies are above and below the frequency of the carrier signal. The center of the sidebands is determined by the carrier frequency of the received RF signal that is combined with the optical carrier signal. The sidebands, which are substantially lower in amplitude compared to the carrier signal, are one hundred eighty degrees (180°) out of phase with one another. Prior to being applied to a receiver located at the convenient site, i.e., the electronics bay, the phase-modulated signal is selectively filtered by an optical filter whose amplitude transfer function is sinusoidal. The frequency spacing between the maxima and minima of the sinusoid is determined by the frequency difference between the frequency of the carrier signal and the center frequency of the sidebands. The frequency of the carrier signal and the sinusoidal amplitude transfer function are aligned so as to substantially attenuate the power of the carrier signal relative to the power of at least one of the sidebands.

More specifically, the optical filter converts the phase-modulated signal into one or more signals suitable for detection by a photodiode detector. The amplitude and, thus, the power of the carrier signal in each of the one or more signals is reduced substantially relative to the amplitude and, thus, the power of the sideband signals.

In accordance with other aspects of this invention, the filter transfer function is designed not only to substantially attenuate the power of the carrier signal, the phase of one of the sidebands is also shifted by one hundred and eighty degrees (180°). The result is a single signal containing two in-phase sidebands. When the single signal is detected by a photodiode, the received (i.e., modulating) signal applied to the phase modulator is recovered due to the beating of the sidebands and the carrier signal and the summation of the in-phase sideband signals that result.

In accordance with other aspects of this invention, the design and biasing of the optical filter is such that the bottom or null point of the "minima" of the sinusoidal response generally coincides with, but is slightly offset from, the frequency of the carrier signal, and the "maxima" of the sinusoidal response generally coincide with the upper and lower sidebands. As a result, the amplitude and, thus, the power of the carrier signal is reduced vis-à-vis the amplitude of the sidebands. The phase shift of the filter is linear, except at the null point where a rapid one hundred eighty degree (180°) phase shift occurs.

In accordance with alternate aspects of this invention, the filter transfer function creates two output signals each containing one of the sidebands and approximately one-half of the carrier signal. The phase of one of the sidebands and its associated part of the carrier signal is phase shifted by one hundred and eighty degrees (180°). When the two signals are detected by a pair of photodiodes (one for each signal) and the results of the detection are subtractively combined, the received (i.e., the modulating) signal applied to the phase modulator is recovered. More specifically, as with the previously described filter, the amplitude transfer function of the filter is sinusoidal. However, rather than designing and biasing the filter such that the "minima" in the sinusoidal amplitude transfer function is generally aligned with the frequency of the carrier signal, the filter is designed and biased so that a half-power point of the sinusoidal amplitude transfer function is aligned with the frequency of the carrier signal.

In accordance with other aspects of this invention, the optical filter is a delay line filter.

In accordance with further aspects of this invention, the delay line filter includes a bias control that is used to control (frequencywise) the position of the sinusoidal amplitude transfer function of the filter vis-à-vis the frequency of the optical carrier signal.

In accordance with still other aspects of this invention, the bias control is controlled such that the power of the optical carrier signal included in the output of the filter is insufficient to destroy the photodiodes that receive the signal or cause them to become nonlinear.

As will be readily appreciated from the foregoing summary, the invention provides a phase-modulated fiber optic communication link that includes carrier signal filtering. Because the link does not employ an MZ modulator, the disadvantages associated with the use of such modulators are avoided. More specifically, the use of a phase modulator eliminates the need for electronic circuitry and DC power at the modulation site, i.e., the location of the remote antenna in an airborne platform. A simple passive phase modulator comprising a straight channel optical waveguide with an RF electrode is contemplated for use in actual embodiments of the invention. Because the modulator is passive, the costs and time necessary to maintain and repair remote bias, temperature compensation, or other circuitry is eliminated. The invention includes a versatile filter capable of providing adjustable amounts of laser carrier suppression. The invention uses a simpler and less costly receiver than receivers employed in existing communications links that employ phase modulation. As noted above, such communication links require an expensive coherent local oscillator and complicated receiver circuitry. The invention provides optical carrier filtering and phase demodulation in one signal processing operation. Phase modulated fiber optic communication links formed in accordance with this invention are capable of achieving a dynamic range that would necessitate power levels that would risk damage to a photodetector if achieved in an MZ modulator communication link.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
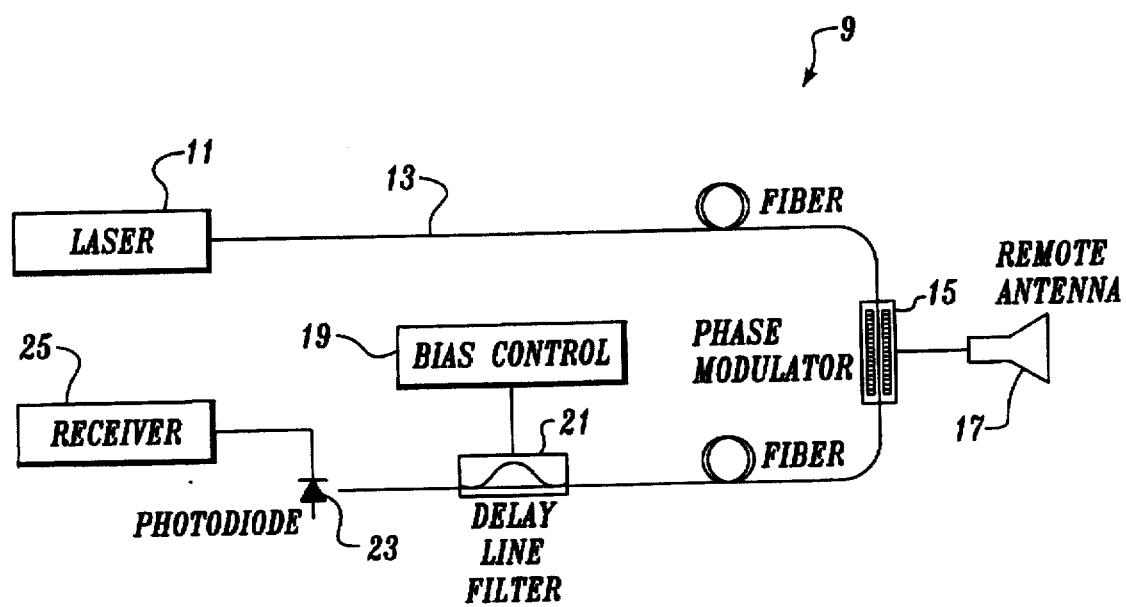
FIG. 1 is pictorial diagram of a phase-modulated optical fiber communication link formed in accordance with the present invention suitable for conveying an RF signal from a remotely located antenna to a conveniently located receiver.

FIG. 1 is a pictorial diagram of a phase-modulated fiber optic communication link 9 formed in accordance with the invention. The illustrated phase-modulated fiber optic communication link is ideally suited for communicating a modulated RF signal from a remote antenna site, such as on the wings of an aircraft, to a more accessible location, such as an electronics bay in the fuselage of the aircraft.

The phase-modulated fiber optic communication link 9 illustrated in FIG. 1 includes: a laser 11; an optical fiber 13; a phase modulator 15; a delay line filter 21 whose frequency is controlled by a bias control 19; and a photodiode 23 for converting optical signals into electrical signals. FIG. 1 also includes a remotely located antenna 17 and a receiver 25.

The laser 11, the delay line filter 21 including the bias control 19, the photodiode 23, and the receiver 25 are in a convenient location, such as the electronics bay of an aircraft. Thus, all of these items are readily available for servicing and repair. Only the antenna 17 and the phase modulator 15 are remotely located and, thus, difficult to access.

The laser 11 is a single-frequency laser that produces the carrier signal used by the phase-modulated fiber optic communication link 9 shown in FIG. 1. A variety of types of lasers can be used. One suitable laser is a diode pumped Nd:YAG laser or its equivalent.

The carrier signal produced by the laser 11 is conveyed by the optical fiber 13 to the phase modulator 15. Preferably, the optical fiber 13 is a single-mode, polarization preserving optical fiber. If other types of optical fibers 13 are employed, polarization compensators should be incorporated into the link.

When the remotely located antenna 17 receives a radio frequency (RF) signal, the signal is applied to the phase modulator 15 which phase modulates the carrier signal provided by the laser 11. The phase modulator 15 is a semiconducting phase modulator. While an $LiNbO_3$-based phase modulator is the presently preferred phase modulator, phase modulators based on other types of semiconducting materials, such as gallium arsenide or indium phosphide, may be used.

When the phase modulator 15 modulates the carrier signal provided by the laser 11, a modulated signal having upper and lower sidebands centered around the frequency of the carrier signal is provided. The sidebands are one hundred eighty degrees (180°) out of phase with one another. As will be readily appreciated by those familiar with phase modulation, the centers of the sidebands are determined by the carrier frequency of the RF signal. More specifically, the center of the upper sideband is equal to the optical carrier frequency plus the RF carrier frequency, and the center of the lower sideband is equal to the optical carrier frequency minus the RF carrier frequency. Both sidebands contain the information or data carried by the RF carrier signal. In this regard, the RF signal can be modulated in any one of several well-known ways, including frequency modulation and pulse code modulation. Further, the RF signal can carry several channels of data.

The optical fiber 13 conveys the modulated optical carrier signal to the delay line filter 21. As will be better understood from the following discussion, the delay line filter has a sinusoidal amplitude transfer function. The sinusoidal amplitude transfer function includes a minima between two maxima. The delay line filter is designed and tuned such that the carrier frequency falls in the minima and the sidebands lie beneath the maxima. Thus, the delay line filter 21 attenuates the power of the optical carrier signal relative to the sidebands. The delay line filter also performs a one hundred eighty degree (180°) phase shift on one of the sidebands. As a result, after passing through the delay line filter 21, the modulation sidebands are in phase. The delay line filter 21 includes a thin film heater and, as described below, is turned by the bias control 19 controlling the amount of power applied to the heater.

The output of the delay line filter 21 is applied to the photodiode 23, which detects the modulation signal and produces an electrical signal that corresponds to the original RF signal received by the remote antenna 17. More specifically, in a conventional manner the photodiode detects the RF signal by mixing the optical carrier with the sidebands. This produces two coherent RF signals that are automatically summed together since the sidebands are in phase. If the sidebands were not in phase, a much more complex demodulation system would be required.

Figure 2:
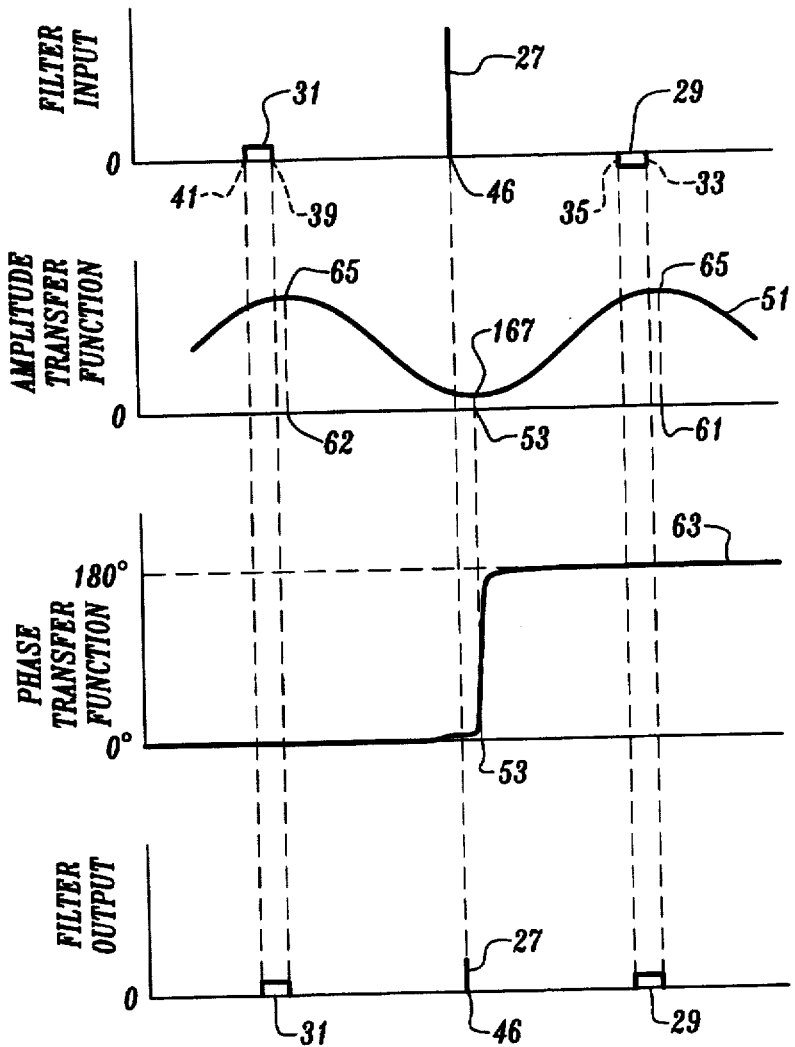
FIGS. 2A–2D are a series of graphs illustrating various features of the delay line filter included in the embodiment of the invention shown in FIG. 1.

FIGS. 2A–2D are a series of graphs illustrating various features of the delay line filter 21 included in the invention shown in FIG. 1. Each of the graphs cover a different function plotted against frequency, which is displayed on the horizontal axis. FIG. 2A is a graph of the modulated input to the delay line filter 21. The graph includes the previously described optical carrier 27 and the upper and lower sidebands 29 and 31. The upper and lower sidebands 29 and 31 are located above and below the frequency 46 of the optical carrier signal. As noted above, the location of the sidebands is determined by the RF carrier frequency. The data received by the remote antenna and contained in the RF signal is located in the sidebands, not in the optical carrier 27. For clarity of illustration, the amplitudes of the optical carrier 27 and the upper and lower sidebands 29 and 31 are not illustrated in true proportion. The magnitude of the optical carrier 27 is substantially greater than that of the sidebands. The difference is typically at a value lower than −30 dBc.

As noted above and shown in FIG. 2B, the amplitude transfer function of the delay line filter 21 as a function of frequency is sinusoidal. More specifically, the transfer function shown by line 51 in the graph of FIG. 2B includes a minima. Located on either side of the minima are maxima. The minima has a maximum attenuation point 67, i.e., a null, at a null frequency 53. Because of design constraints, the null is close to, but not at, zero. The null frequency 53 lies just above the frequency 46 of the carrier signal 27. Typically, the null lies −20 dB or more below the peaks of the maxima.

The peaks 65 of the maxima located on either side of the minima lie above the upper and lower sidebands 29 and 31. That is, both the upper and lower ends 33 and 35 of the upper sideband 29 lie below the frequency 61 of the peak 65 located above the optical carrier frequency 46, and both the upper and lower ends 39 and 41 of the lower sideband 31 lie below the frequency 62 of the peak 65 located below the optical frequency 46.

The phase transfer function of the delay line filter 21 is illustrated in FIG. 2C by line 63. As shown, a rapid one hundred eighty degree (180°) phase shift occurs at the null frequency 53. Thus, the phase transfer function has a step shape. Frequency values lying below the null frequency are not shifted in phase, and frequency values lying above the null frequency 53 are shifted by one hundred eighty degrees (180°). The phase function is not a perfect step. Over a narrow range the phase shift lies between zero degrees (0°) and 180°. As shown in FIG. 2C, the frequency 46 of the optical carrier signal lies just below this narrow range.

Figure 3:
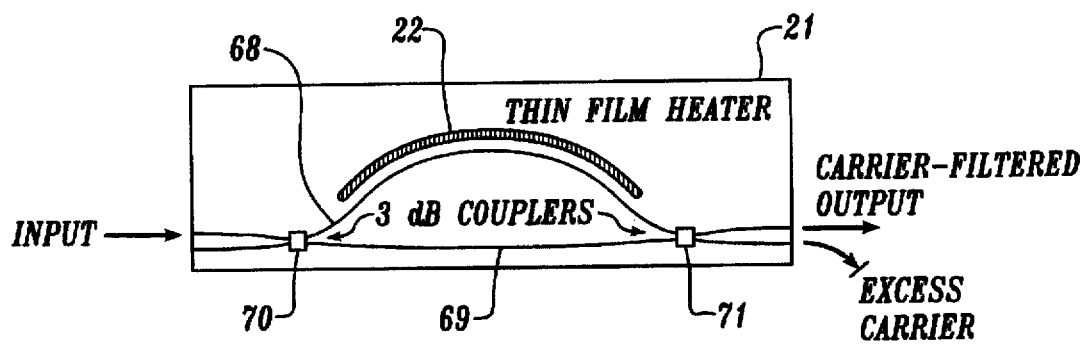
FIG. 3 is a pictorial diagram of a silica delay line filter.

The details of a delay line filter 21 suitable for use in the embodiment of the invention shown in FIG. 1 is shown in FIG. 3. The delay line filter shown in FIG. 3 is a silica optical delay line filter. In addition, or as an alternative, to fiber delay lines, SOS delay lines and Fabry-Perot cavities can be used to create suitable filters to perform demodulation.

The delay line filter 21 shown in FIG. 3 comprises two different length optical paths 68 and 69 joined at either end by couplers 70 and 71. While the couplers can have various values, in one actual embodiment of the invention 3 dB couplers were used. The different length optical paths create an imbalanced interferometer. A thin film heater 72 extends along at least a portion of the longer path 68. The thin film heater 72 controls the position of the filter null relative to the frequency of the carrier signal. More specifically, current flow through the thin film heater and, thus, the heat produced by the thin film heater 72, is controlled by the bias control (FIG. 1 ). Delay line filters of the type shown in FIG. 3 are available from Photonic Integration Research Inc., Columbus, Ohio.

The delay line filter shown in FIG. 3 has two inputs, only one of which is used. The input optical signal is coupled by one of the couplers 70 to both the long and short optical paths 68 and 69. The other ends of the optical paths are coupled together and to the two outputs. One of the outputs is a carrier filtered output and the other is an excess carrier output. The carrier filtered output is applied to the photodiode 23 connected to the receiver 25 (FIG. 1). The carrier filtered output is shown in FIG. 2D.

As shown in FIG. 2D, the amplitude of the carrier 27 is substantially decreased relative to the amplitude of the upper and lower sidebands 29 and 31. Substantially decreasing the amplitude of the carrier 27 helps to ensure that the information contained in the sidebands can be recovered by a photodiode detector demodulating the resulting signal. Excess carrier amplitude can damage photodiode detectors or cause them to become nonlinear. While, preferably, the modulated carrier signal is divided in approximately a 1:1 ratio by the input coupler 70, if desired, other ratios may be utilized when practicing this invention. Regardless of the ratio chosen, the different path lengths create a phase shift between the portions of the modulated carrier signal that arrive at the other (output) coupler. The phase shift causes carrier attenuation to occur as a result of destructive interference that occurs as the two portions recombine. The fine tuning length of the longer path of the delay line filter 21 is controlled by the thin film heater 71, to control the amount of carrier attenuation. More specifically, as noted above, the heat produced by the heater shifts the null point of the amplitude transfer function of the delay line filter with respect to the carrier frequency. This shift controls the amount of attenuation. The nearer the null point is to the carrier frequency, the greater the amount of attenuation. On the other hand, the null point cannot coincide with the carrier frequency. The null point must be slightly offset from the carrier frequency. The offset allows one of the modulation sidebands to be selectively shifted in phase relative to the other in order for the previously described photodiode detector to be used to demodulate the output of the carrier file. If the frequency of the optical carrier 23 were aligned with the null point, the carrier 27 would also be phase shifted. This would prevent demodulation by the single photodiode 23.

In one actual embodiment of the invention, the output of the laser was approximately 100 mW. The chosen delay line filter and its alignment reduced the power of the carrier to substantially less than 2 mW, well below the rated maximum power of a conventional photodiode detector. Filtering of the modulated carrier signal in the manner described above not only avoids damage to the photodiode 23, it also avoids harmonic distortion. Further, such filtering improves signal-to-noise ratio and the dynamic range of the phase-modulated fiber optic communication link 9 for a fixed photocurrent.

As shown in FIG. 2D, both sidebands, and thus the information contained in the sidebands, are passed through the delay line filter 21 substantially unattenuated since the sidebands are aligned near the center of the maxima of the amplitude transfer function of the delay line filter. FIG. 2D also shows that the phase of the lower sideband 31 remains the same after filtering. In contrast, FIG. 2D shows that the phase of upper sideband is shifted by one hundred eighty degrees (180°). This phase shift converts what was a phase-modulated signal into a signal that can be demodulated by a single photodiode detector.

Figure 4:
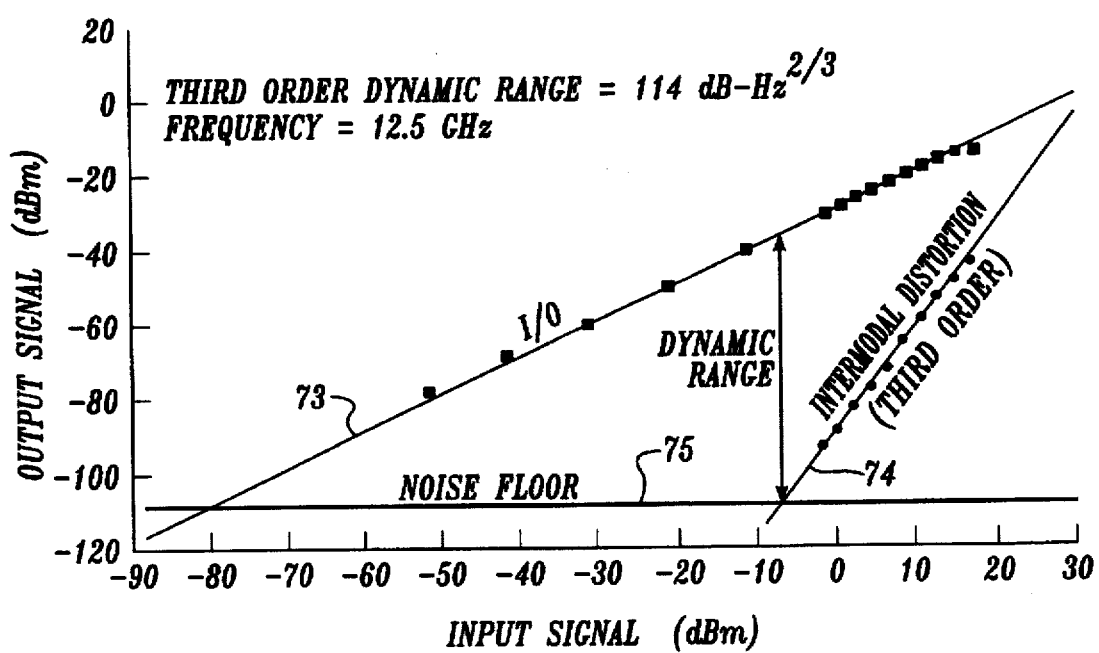
FIG. 4 is a graph that illustrates the performance of one actual embodiment of the invention.

In one actual embodiment of the invention, the chosen delay line filter 21 had a filter period of 25 GHz. For test purposes, the phase modulator 15 was driven with two closely spaced tones, one at 12.5 GHz and the other near 12.5 GHz (specifically, 12.4 GHz). The filter heater was controlled using a simple feedback circuit designed to maintain the carrier power at a level such as the photocurrent output of the photodiode 23 remained near 1.5 mA. The sidebands were aligned with the maxima of the sinusoidal amplitude transfer function of the filter in the manner described above. FIG. 4 is a graph of the results of the two tone measurement. The abscissa is the input signal value in dBm and the ordinate is the output signal value in dBm. The high linearity of this demodulation method is shown by line 73, which is a plot of the output signal versus the input signal. Line 74 shows third order intermodal distortion. The third order dynamic range of this actual embodiment of the invention is 114 dB-Hz$^{2/3}$. Line 75 depicts the noise floor. As will be readily appreciated by those skilled in this art from a review of FIG. 3, when compared with other types of communication links, a phase-modulated fiber optic communication link formed in accordance with this invention has a relatively high dynamic range at relatively low photocurrent levels. In this regard, an MZ communication link having a similar degree of linearity would involve a photocurrent of approximately 10 mA, enough current to damage a photodetector.

The results of numerical calculations used to model the bandwidth of a phase-modulated fiber optic communication link formed in accordance with this invention show that the frequency response is flat to within approximately 1 dB over an octave bandwidth. A filter period of 25 GHz has a usable bandwidth of 8-16 GHz. The octave bandwidth restriction results from the need to avoid second harmonics generated during demodulation. Because the bandwidth of most applications is sub-octave, the invention has the potential for use in many applications.

Figure 5:
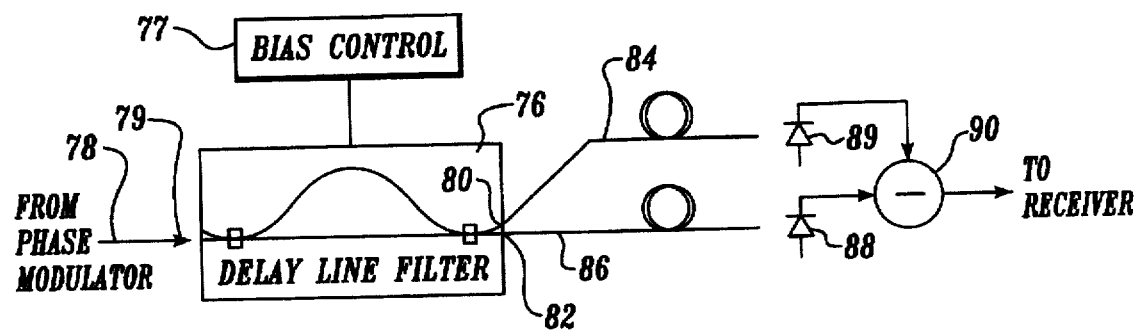
FIG. 5 is a pictorial diagram of a portion of an alternative embodiment of a phase-modulated optical fiber communication link formed in accordance with this invention.

FIG. 5 illustrates a portion of an alternative embodiment of a phase-modulated fiber optic communication link formed in accordance with this invention. The portion not shown is the same as in FIG. 1. More specifically, FIG. 5 includes a delay line filter 76, a bias control 77, two output optical fibers 84 and 86, two photodiodes 88 and 89, and a differential detector 90. As with the delay line filter 21 illustrated in FIGS. 1 and 3, the delay line filter 76 shown in FIG. 5 has two inputs and two outputs. Only one of the inputs 79 is used. It is connected to the optical fiber 78 connected to the phase modulator 15. Rather than only using a single output, both outputs 80, 82 of the delay line filter 76 shown in FIG. 5 are used.

The phase-modulated signal enters the delay line filter 21 at the used input 79. As will be better understood from the graphs shown in FIGS. 6A-6D and FIGS. 7A-7D and described below, the amplitude transfer characteristic of the delay line filter 76 used in the embodiment of the invention shown in FIG. 5 is different from the amplitude transfer function of the delay line filter 21 used in the embodiment of the invention shown in FIGS. 1 and 3. While both amplitude transfer functions are sinusoidal, rather than the frequency of the optical carrier signal produced by the laser 11 being located in the minima of the sinusoidal amplitude transfer function, the delay line filter 76 shown in FIG. 5 is adjusted such that the frequency of the optical carrier signal is aligned with a half-power point in the sinusoidal amplitude transfer function. As a result, half of the power contained in the optical carrier signal emerges from each of the outputs 80, 82 of the delay line filter 21. The sinusoidal nature of the amplitude function removes one of the sidebands in each output by attenuation. As a result, each output contains approximately one-half of the carrier and one of the sidebands.

The output optical fibers 84 and 86 couple the outputs 80 and 82 of the delay line filter 76 to the photodiodes-one to each photodiode. The photodiodes demodulate the signals they receive by mixing the carrier and the sideband. The demodulated RF signals are applied to the differential detection, which sums the demodulated signals since the demodulated signals are one hundred and eighty degrees (180°) out of phase. The combined signal is applied to the receiver25 (FIG. 1). The bias control 77 controls the bias alignment of the amplitude transfer function of the delay line filter and the frequency of the optical carrier signal produced by the laser 11.

Figure 6A:
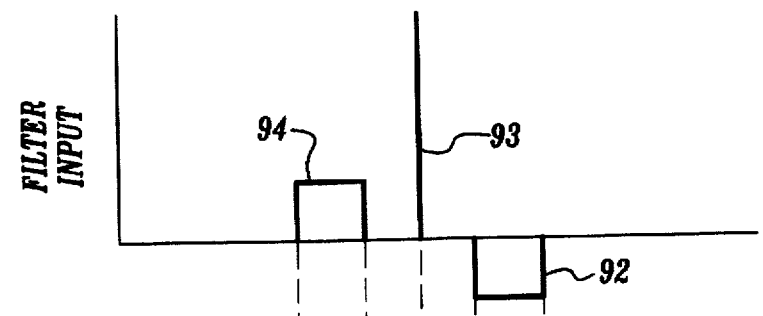
FIGS. 6A–6D are a series of graphs illustrating some of the features of the delay line filter included in the embodiment for the invention shown in FIG. 5.
Figure 6B:
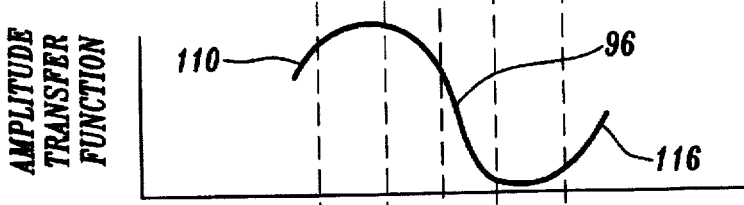

As noted above, FIGS. 6A-6D and 7A-7D are a series of graphs that depict the operation of the delay line filter 76 shown in FIG. 5. FIGS. 6A and 7A are the same. They show the phase-modulated signal applied to the delay line filter 76. More specifically, both FIG. 6A and FIG. 7A include the optical carrier signal 93 and upper and lower sidebands 92 and 94. FIG. 6B illustrates the amplitude transfer function 110 relative to one of the outputs of the delay line filter and its alignment with the optical carrier 93. As illustrated, the optical carrier 93 is aligned with the crossover point 96 of the amplitude transfer function 110, which, as noted above, has a sinusoidal shape. The characteristics of the filter are chosen such that the position of the adjacent maxima and minima are generally aligned with the sidebands 92 and 94. As a result, as shown in FIG. 6D, the sideband that coincides with the maxima passes through the filter substantially unattenuated. The sideband aligned with the minima is substantially attenuated (preferably at zero). The magnitude of the optical carrier 93 is reduced by approximately fifty percent (50%).

Figure 6C:
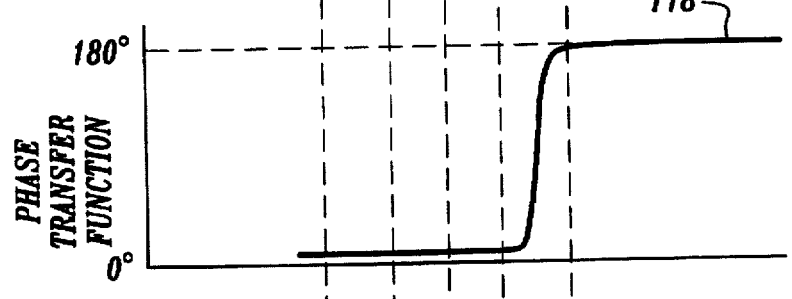
Figure 6D:
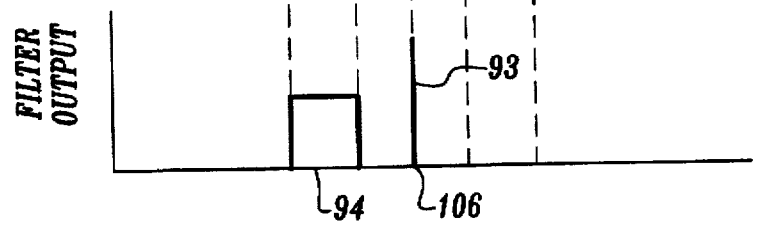
Figure 7A:
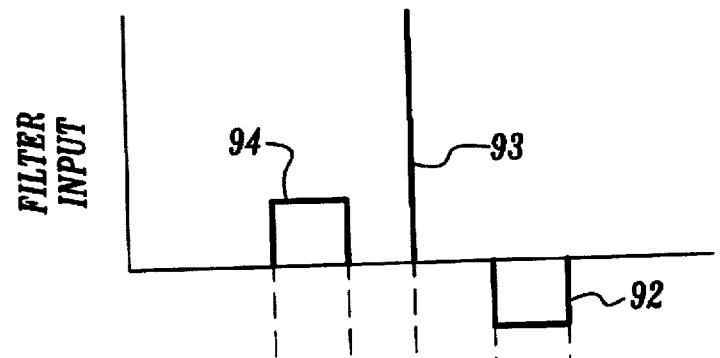
FIGS. 7A–7D are a series of graphs illustrating other features of the delay line filter included in the embodiment of the invention shown in FIG. 5.

FIG. 6C is included for completion even though it has little effect on the output depicted in FIGS. 6A-6D. FIG. 6C shows that a rapid hundred and eighty degree(180°) phase shift occurs at the null point of the minima of the amplitude transfer function 96 shown in FIG. 6B.

Figure 7B:
Figure 7C:
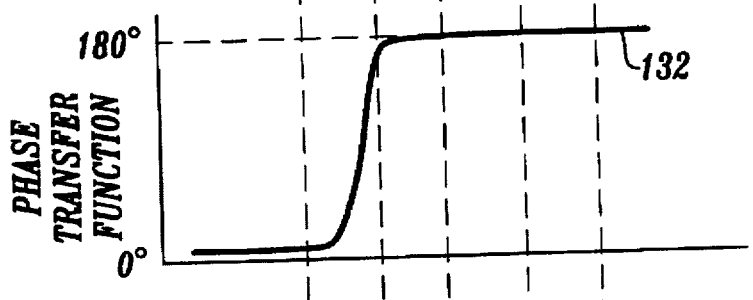
Figure 7D:
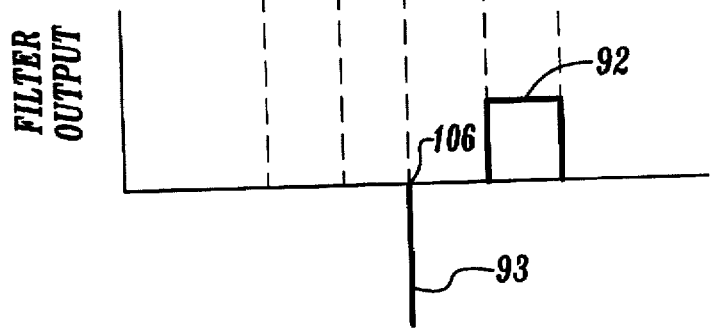

FIG. 7B illustrates the amplitude transfer function 130 related to the other output of the delay line filter and its alignment with the optical carrier 93. As illustrated, the optical carrier is aligned with the crossover point of the amplitude transfer function 130, which, as noted above, has a sinusoidal shape. The difference between the FIG. 6B amplitude transfer function and the FIG. 7B amplitude transfer function is that they are reversed. Rather than the maxima lying below the frequency of the carrier signal 93 (FIG. 6B), the maxima lies above the frequency of the carrier signal 93 (FIG. 7B). As a result, as shown in FIG. 7D, the sideband that was attenuated in FIG. 6D is unattenuated in FIG. 2D and the sideband that was unattenuated in FIG. 6D is attenuated in FIG. 7D. In addition, the phase of the unattenuated sideband and the portion of the carrier contained in this output of the delay line filter are shifted by one hundred and eighty degrees (180°). This phase shifting is due to the one hundred and eighty degree (180°) rapid phase shift that occurs at the null point of the minima of the amplitude transfer function 130 shown in FIG. 7B. This phase shift is shown in FIG. 7C.

The suppression of a sideband in each output of the delay line filter 76 avoids the signal cancellation that would occur as a result of sideband beating during detection by the related photodiode 88. A phase-modulated fiber optic communication link formed in accordance with the alternative arrangement depicted in FIG. 5 eliminates second order distortions and may have improved gain and signal-to-noise ratio in comparison with the embodiment of the invention shown in FIG. 1. Differential detection also has the advantage of suppressing laser intensity noise.

While phase-modulated fiber optic communication links formed in accordance with this invention are designed for use in coupling inconveniently (i.e., remotely) located antennas with conveniently located electronics, it is to be understood that the invention may also find use in other environments involving the communication of RF signals from one site to another site, one of which does not necessarily have to be inconveniently located. Both sites may be conveniently located.

While the presently preferred embodiments of the invention have been illustrated and described, it will be appreciated that, within the scope of the appended claims, various changes can be made therein without departing from the spirit and scope of the invention.

The embodiments of the invention in which an exclusive property or privilege is claimed are defined as follows:

1. A method of creating a phase-modulated fiber optic communication link with carrier signal filtering comprising:
   (a) generating an optical carrier signal;
   (b) phase modulating said optical carrier signal with a modulated RF signal to produce a phase-modulated optical signal containing said optical carrier signal and a pair of sidebands, the center frequency of one of said sidebands lying above and the center frequency of the other of said sidebands lying below the frequency of said optical carrier signal, one of said sidebands being out of phase by 180 degrees with the other of said sidebands, the power level of said sidebands being substantially less than the power level of said optical carrier signal; and (c) demodulating said phase-modulated optical signal by:

(i) optically filtering said phase-modulated optical signal to produce at least one output signal containing a part of said optical carrier signal and at least one of said sidebands, the power of said part of said optical carrier signal relative to the power of said at least one sideband being substantially reduced by said optical filtering; and (ii) recovering said modulated RF signal by applying said at least one output signal to a photodiode detector.

2. The method claimed in claim 1 wherein demodulating said phase-modulated signal includes phase shifting one of said sidebands by 180 degrees so that both of said sidebands are in phase.

3. The method claimed in claim 2 wherein two output signals are produced by the optical filtering and phase shifting of said phase-modulated optical signal, each of said output signals including a part of said optical carrier signal and one of said sidebands, the power of said part of said optical carrier signal relative to the power of the sideband being substantially reduced by said optical filtering.

4. The method claimed in claim 2 wherein two output signals are produced by the optical filtering of said phase-modulated optical signal, each of said output signals including a part of said optical carrier signal and one of said sidebands, the power of said part of said optical carrier signal relative to the power of the sideband being substantially reduced by said optical filtering.

5. The method of claim 1 wherein said optical filtering of said phase-modulated optical signal to produce at least one output signal containing a part of said optical carrier signal and at least one of said sidebands comprises passing said phase-modulated optical signal through an optical filter having a sinusoidal amplitude transfer function.

6. The method of claim 5 wherein said optical filter is a delay line filter.

7. A phase-modulated fiber optic communication link with carrier signal filtering comprising:

(a) a laser for producing an optical carrier signal;

(b) an optical fiber for conveying said optical carrier signal to a phase modulator;

(c) phase modulator for receiving said optical carrier signal and phase modulating said optical carrier signal with a modulated RF signal to produce a phase-modulated optical signal containing said optical carrier signal and a pair of sidebands, the center frequency of one of said sidebands lying below the frequency of said optical carrier signal and the center frequency of the other of said sidebands lying above the frequency of said optical carrier signal, said sidebands being out of phase by 180 degrees with each other, the power level of said sidebands being substantially less than the power level of said optical carrier signal;

(d) an optical fiber for conveying said phase-modulated optical signal to a demodulator; and (e) a demodulator for receiving and demodulating said phase-modulated optical signal, said demodulation including:

(i) an optical filter for optically filtering said phase-modulated optical signal and producing at least one output signal containing a part of said optical carrier signal and at least one of said sidebands, the power of said part of said optical carrier signal relative to the power of said at least one sideband being substantially reduced by said optical filter; and (ii) a photodiode detector for receiving the at least one output of said optical filter and recovering said modulated RF signal.

8. The apparatus claimed in claim 7 wherein said optical filter also phase shifts one of said sidebands by 180 degrees so both of said sidebands are in phase.

9. The apparatus claimed in claim 8 wherein said at least one output signal includes said part of said optical carrier signal and both of said sidebands.

10. The apparatus claimed in claim 9 wherein said photodiode detector includes a single photodiode.

11. The apparatus claimed in claim 9 wherein said optical filter has a sinusoidal amplitude transfer function.

12. The apparatus claimed in claim 11 wherein said optical filter has a step phase transfer function.

13. The apparatus claimed in claim 12 wherein said step phase transfer function is located in the null of said sinusoidal amplitude transfer function.

14. The apparatus claimed in claim 13 wherein said photodiode detector includes a single photodiode.

15. The apparatus claimed in claim 8 wherein said optical filter produces two output signals, each of said output signals including part of said optical carrier signal and one of said sidebands.

16. The apparatus claimed in claim 15 wherein said photodiode detector includes two photodiodes, one for receiving each of the two output signals of said optical filter and a differential detector connected to said two photodiodes for combining the electrical signals produced by said two photodiodes.

17. The apparatus claimed in claim 15 wherein said optical filter has a sinusoidal amplitude transfer function.

18. The apparatus claimed in claim 17 wherein said optical filter has a step phase transfer function.

19. The apparatus claimed in claim 18 wherein said step phase transfer function is located in the null of said sinusoidal amplitude transfer function.

20. The apparatus claimed in claim 17 wherein said photodiode detector includes two photodiodes, one for receiving each of the two output signals of said optical filter and a differential detector connected to said two photodiodes for combining the electrical signals produced by said two photodiodes.

21. The apparatus claimed in claim 7 wherein said optical filter is a delay line filter.

* * * * *

UNITED STATES PATENT AND TRADEMARK OFFICE
CERTIFICATE OF CORRECTION

PATENT NO. : 5,724,169
DATED : March 3, 1998
INVENTOR(S) : M.J. LaGasse

It is certified that error appears in the above-indentified patent and that said Letters Patent is hereby corrected as shown below:

COLUMN  LINE

[57]  Abstract line 4 of text  "a optical" should read --an optical--

11 (Claim 1, lines 16-24)  10-18  Further indent one time the last two subparagraphs of the claim, beginning with "(i) optically filtering . . ." and ending with ". . . photodiode detector."

11 (Claim 4, line 2)  31  After "the optical filtering" insert --and phase shifting--

Signed and Sealed this

Twenty-first Day of July, 1998

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,724,169
DATED : March 3, 1998
INVENTOR(S) : M.J. LaGasse

It is certified that error appears in the above-identified patent and that said Letters Patent is hereby corrected as shown below:

COLUMN     LINE

11     23-29     Replace the text of Claim 3 with the following text:
(Claim 3,   lines 1-7)     --The method claimed in Claim 2 wherein said at least one output signal includes said part of said optical carrier signal and both of said sidebands.--

Signed and Sealed this

First Day of December, 1998

*Attest:*

BRUCE LEHMAN

*Attesting Officer*     *Commissioner of Patents and Trademarks*